United States Patent Office 2,934,555
Patented Apr. 26, 1960

2,934,555

DIALKYLPHOSPHONOALKYL ACRYLATES AND METHACRYLATES AND PROCESS FOR PREPARING SAME

Joseph L. O'Brien, Elkins Park, and Constance A. Lane, Philadelphia, Pa., assignors to Rohm & Haas Company, Philadelphia, Pa., a corporation of Delaware No Drawing. Application December 12, 1957
Serial No. 702,250

11 Claims. (Cl. 260—461)

This invention relates to polymerizable acrylic or methacrylic esters of dialkyl hydroxyalkylphosphonates having the general formula:

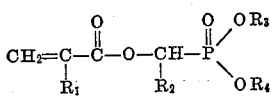

wherein $R_1$ is a hydrogen atom or a methyl group, $R_2$ is a hydrogen atom or an alkyl group having one to three carbon atoms, and $R_3$ and $R_4$ each represent an alkyl group having one to four carbon atoms.

Typical of compounds within the scope of the present invention are those represented by the following structural formulas and names:

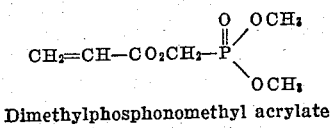

Dimethylphosphonomethyl acrylate

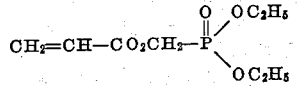

Diethylphosphonomethyl acrylate

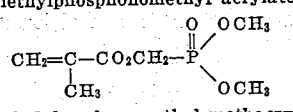

Dimethylphosphonomethyl methacrylate

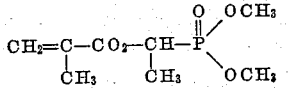

1-dimethylphosphonoethyl methacrylate

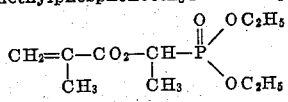

1-diethylphosphonoethyl methacrylate

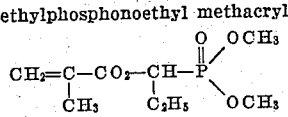

1-dimethylphosphonopropyl methacrylate

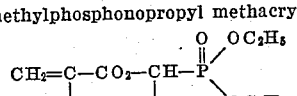

1-diethylphosphonopropyl methacrylate

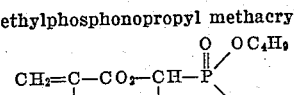

1-dibutylphosphonobutyl methacrylate

Such compounds may be prepared by the addition of a dialkyl hydrogen phosphite to an aldehyde to form the dialkyl 1-hydroxyalkylphosphonate, followed by reaction of the latter intermediate with acrylyl or methacrylyl chloride in the presence of a hydrogen chloride acceptor such as pyridine or sodium carbonate. The synthetic procedure is illustrated by the following equations:

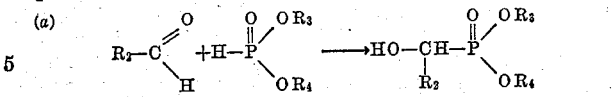

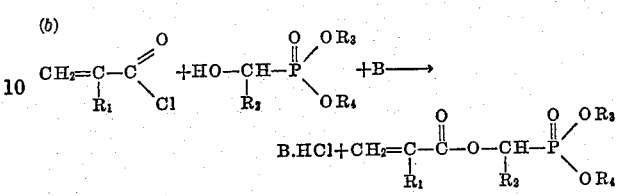

EXAMPLE 1

*Dimethylphosphonomethyl methacrylate*

A mixture of 66 grams (2 moles) of 90% paraformaldehyde and 220 grams (2 moles) of dimethyl hydrogen phosphite was heated with stirring to 80–90° C. for two hours, resulting in a quantitative yield of crude dimethyl hydroxymethylphosphonate. To a solution of 70 grams of crude dimethyl hydroxymethylphosphonate, 200 ml. anhydrous benzene and 63 grams of anhydrous sodium carbonate, there was added 53 grams of methacrylyl chloride at 25–35° C. over a period of 40 minutes. Stirring was continued for 24 hours at 25–35° C. and the temperature finally raised to 50° C. for one hour. The reaction mixture was filtered and the benzene removed under reduced pressure in the presence of 2.0 grams of N,N'-di-2(1,4-naphthoquinonyl)-p-phenylenediamine. Dimethylphosphonomethyl methacrylate (13.7% yield) distilled at 80–5° C./0.04 mm., $n_D^{25}$ 1.4347, 14.0% P (theo. 14.9% P).

EXAMPLE 2

*Diethylphosphonomethyl methacrylate*

A mixture of 84 grams (0.5 mole) of diethyl hydroxymethylphosphonate (from paraformaldehyde and diethyl hydrogen phosphite, B.P. 112–23° C./0.5 mm., 17.6% P (theo. 18.5%) $n_D^{25}$ 1.4250), 200 ml. of dry benzene and 44 grams (0.55 mole) of anhydrous pyridine was placed in a one-liter 3-neck flask equipped with a stirrer, thermometer, addition funnel, condenser and drying tube. Methacrylyl chloride, 53 grams (0.5 mole), was added over a period of 30 minutes while the temperature was held at 0.5° C. by application of an ice-water bath. The reaction mixture was held at 0–5° C. for one hour and and then allowed to stand at room temperature, 25–35° C., for 24 hours. The benzene solution was decanted from the rather sticky solid, which was dissolved in water, saturated with sodium chloride and resultant aqueous solution extracted twice with benzene. After drying the combined benzene extracts over magnesium sulfate, the benzene was removed under reduced pressures in the presence of 2.0 grams of N,N'-di-2(1,4-naphthoquinonyl)-p-phenylenediamine. Diethylphosphonomethyl methacrylate, 72 grams (61% yield) distilled at 87–102° C./0.05 mm., $n_D^{25}$ 1.4383, 13.9% P (theo. 13.12% P), sap. no. 468 (theo. 475).

EXAMPLE 3

*1-dimethylphosphonoethyl methacrylate*

To a mixture of 220 grams (2 moles) of dimethyl hydrogen phosphite and 95 grams (2.16 moles) of acetaldehyde, there was added 0.5 gram of sodium. A strong exotherm occurred and the temperature was maintained at 30–40° C. by application of an ice-water bath. The reaction mixture was then allowed to stand at room temperature, 25–35° C. for 24 hours, resulting in a quantitative yield of crude dimethyl 1-hydroxyethylphosphonate. To a solution of 77 grams (0.5 mole) of crude dimethyl 1-hydroxyethylphosphonate, 53 grams (0.5 mole) of sodium carbonate and 200 ml. of anhydrous benzene, there was added 53 grams (0.5 mole) of methacrylyl chloride at 25–35° C. over a period of 40 minutes. After stirring at 25–35° C. for 24 hours, the reaction mixture was heated to 50° C. for one hour, cooled and filtered. The benzene was removed under reduced pressure in the presence of 1.5 grams of N,N'-di-2(1,4-naphthoquinonyl)-p-phenylenediamine and 78 grams, 70% yield, of 1-dimethylphosphonoethyl methacrylate distilled at 78–84° C./.07 mm., $n_D^{25}$ 1.4419, 13.74% P (theo. 13.96%).

EXAMPLE 4

1-diethylphosphonoethyl methacrylate

To a mixture of 276 grams of diethyl hydrogen phosphite and 95 grams of acetaldehyde, there was added 0.5 gram of sodium. The temperature was maintained at 30–40° C. by application of an ice-water bath. After stirring at 25–35° C. for 24 hours, there was obtained a quantitative yield of crude diethyl 1-hydroxyethylphosphonate. To a solution of 182 grams (1 mole) of crude diethyl 1-hydroxyethylphosphonate, 106 grams (1 mole) of anhydrous sodium carbonate and 400 ml. of dry benzene, there was added 106 grams (1 mole) of methacrylyl chloride at 25–35° C. over a period of 40 minutes. After stirring for four hours at 30° C. the solution became very thick and an additional 100 ml. of dry benzene was added. After standing at 25–35° C. for 24 hours, the reaction mixture was filtered and the benzene removed under reduced pressure in the presence of 2.5 grams of N,N'-di-2(1,4-naphthoquinonyl)-p-phenylenediamine. Distillation gave 105 grams (42% yield) of 1-diethylphosphonoethyl methacrylate, B.P. 70–90° C./.02 mm., $n_D^{25}$ 1.4365, 11.9% P (theo. 12.4%).

EXAMPLE 5

1-dimethylphosphonopropyl methacrylate

Addition of a small piece of sodium to a mixture of 58 grams (1 mole) of propionaldehyde and 110 grams of dimethyl hydrogen phosphite caused the temperature to rise to 85° C. External heat was then applied and the temperature held at 100° C. for two hours. Distillation gave a 74% yield of dimethyl 1-hydroxypropylphosphonate, B.P. 111–113° C./0.5 mm., $n_D^{25}$ 1.4395, 19.1% P (theo. 18.5% P), 36.10% C (theo. 35.71% C), 8.00% H (theo. 7.74% H).

To a solution of 84 grams (0.5 mole) of dimethyl 1-hydroxypropylphosphonate, 40 grams of pyridine and 300 ml. of dry benzene, there was added 53 grams (0.5 mole) of methacrylyl chloride at 25–35° C. over a period of 30 minutes. After stirring at 28° C. for three hours, the reaction mixture was allowed to stand at room temperature overnight. The benzene solution was decanted from the sticky solid, which was then dissolved in water and the aqueous solution saturated with sodium chloride and extracted with benzene. The benzene was removed from the combined extracts, after drying over magnesium sulfate, under reduced pressure in the presence of 2.0 grams of N,N'-di-2(1,4-naphthoquinonyl)-p-phenylenediamine. Distillation of the residue gave a 22% yield of 1-dimethylphosphonopropyl methacrylate, B.P. 88–100° C./0.06 mm., $n_D^{25}$ 1.4423, 12.2% P (theo. 13.2% P).

EXAMPLE 6

1-diethylphosphonopropyl methacrylate

Sodium, 0.5 gram, was added to a mixture of 120 grams of propionaldehyde and 276 grams of diethyl hydrogen phosphite and the temperature held at 30–40° C. by application of an ice-water bath. After standing at 25–35% C. for 72 hours, a quantitative yield of crude diethyl 1-hydroxypropylphosphonate was obtained.

To a solution of 98 grams of crude diethyl 1-hydroxypropylphosphonate, 53 grams of sodium carbonate and 200 ml. of benzene, there was added 53 grams of methacrylyl chloride at 30–35° C. over a period of 40 minutes. After stirring at 25–35° C. for 24 hours, the reaction mixture was heated to 50–55° C. for one hour. A 35% yield of 1-diethylphosphonopropyl methacrylate distilled at 88–100° C./0.01 mm., $n_D^{25}$ 1.4365, 12.0% P (theo. 11.75% P).

EXAMPLE 7

Dimethylphosphonomethyl acrylate

To a mixture of 140 grams (1.0 mole) of dimethyl hydroxymethylphosphonate and 106 grams (1.0 mole) of sodium carbonate in 400 ml. of dry benzene, there was added 90.5 grams (1.0 mole) of acrylyl chloride at 25–30° C. After stirring the reaction mixture at room temperature for 24 hours, the insoluble salts were removed by filtration. After removing the benzene under reduced pressure in the presence of 0.5 gram of hydroquinone, there was obtained 175 grams (90% yield) of a yellow oil, which was identified as dimethylphosphonomethyl acrylate.

In a similar manner, reaction of acrylyl chloride with dimethyl 1-hydroxyethylphosphonate gave 1-dimethylphosphonoethyl acrylate.

EXAMPLE 8

Typical polymers containing the new phosphonate monomers

A mixture containing 6.0 grams of dimethylphosphonomethyl methacrylate, 14.0 grams of methyl methacrylate and 0.02 gram of azodiisobutyronitrile was heated to 60° C. for 24 hours. The resultant clear, hard, colorless polymer was self-extinguishing after five attempted 30-second ignitions with a Bunsen burner.

The degree of flame-resistance and physical properties of the polymer can be altered extensively by varying the composition of the copolymer.

*Usefulness of the invention.*—The subject compounds are useful monomers for polymerization and copolymerization with other acrylic esters to yield flame-resistant plastics, coatings, textile finishes, etc.

We claim:
1. A compound having the general formula

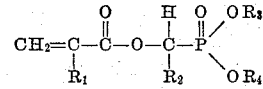

wherein $R_1$ is a member of the class consisting of hydrogen and methyl, $R_2$ is a member of the class consisting of hydrogen and an alkyl group having one to three carbon atoms, and $R_3$ and $R_4$ each is a member of the class consisting of alkyl groups of not over four carbon atoms.

2. 1-diethylphosphonoethyl methacrylate.
3. 1-diethylphosphonopropyl methacrylate.
4. 1-dimethylphosphonoethyl methacrylate.
5. 1-dimethylphosphonopropyl methacrylate.
6. 1-dimethylphosphonomethyl acrylate.
7. A process for preparing a compound of the formula

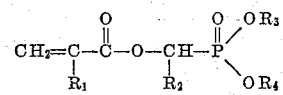

wherein $R_1$ is a member of the class consisting of hydrogen and methyl, $R_2$ is a member of the class consisting of hydrogen and an alkyl group having one to three carbon atoms, and $R_3$ and $R_4$ each is a member of the class consisting of alkyl groups of not over four carbon atoms which comprises reacting together in the presence of a hydrogen chloride acceptor a compound of the formula

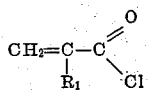

and a compound of the formula

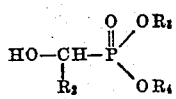

wherein $R_1$, $R_2$, $R_3$, and $R_4$ have the above meanings.

8. A process for preparing 1-diethylphosphonoethyl methacrylate which comprises reacting methacrylyl chloride with diethyl 1-hydroxyethylphosphonate in the presence of sodium carbonate.

9. A process for preparing 1-diethylphosphonopropyl methacrylate which comprises reacting methacrylyl chloride with diethyl 1-hydroxypropylphosphonate in the presence of sodium carbonate.

10. A process for preparing 1-dimethylphosphonopropyl methacrylate which comprises reacting methacrylyl chloride with dimethyl 1-hydroxypropylphosphonate in the presence of pyridine.

11. A process for preparing 1-dimethylphosphonomethyl acrylate which comprises reacting acrylyl chloride with dimethyl 1 - hydroxymethylphosphonate in the presence of sodium carbonate.

References Cited in the file of this patent

UNITED STATES PATENTS

| | | |
|---|---|---|
| 2,478,441 | Wiley | Aug. 9, 1949 |
| 2,636,027 | Coover et al. | Apr. 21, 1953 |
| 2,666,778 | Steinberg | Jan. 19, 1954 |
| 2,743,261 | Coover et al. | Apr. 24, 1956 |
| 2,765,331 | Whetstone et al. | Oct. 2, 1956 |

OTHER REFERENCES

Ackerman et al.: "J. Am. Chem. Soc.," 78, 6025–6027 (December 5, 1956).